April 12, 1966 W. O. DOUD 3,245,529
FLAW DETECTION METHOD AND APPARATUS
Filed April 24, 1964 7 Sheets-Sheet 5

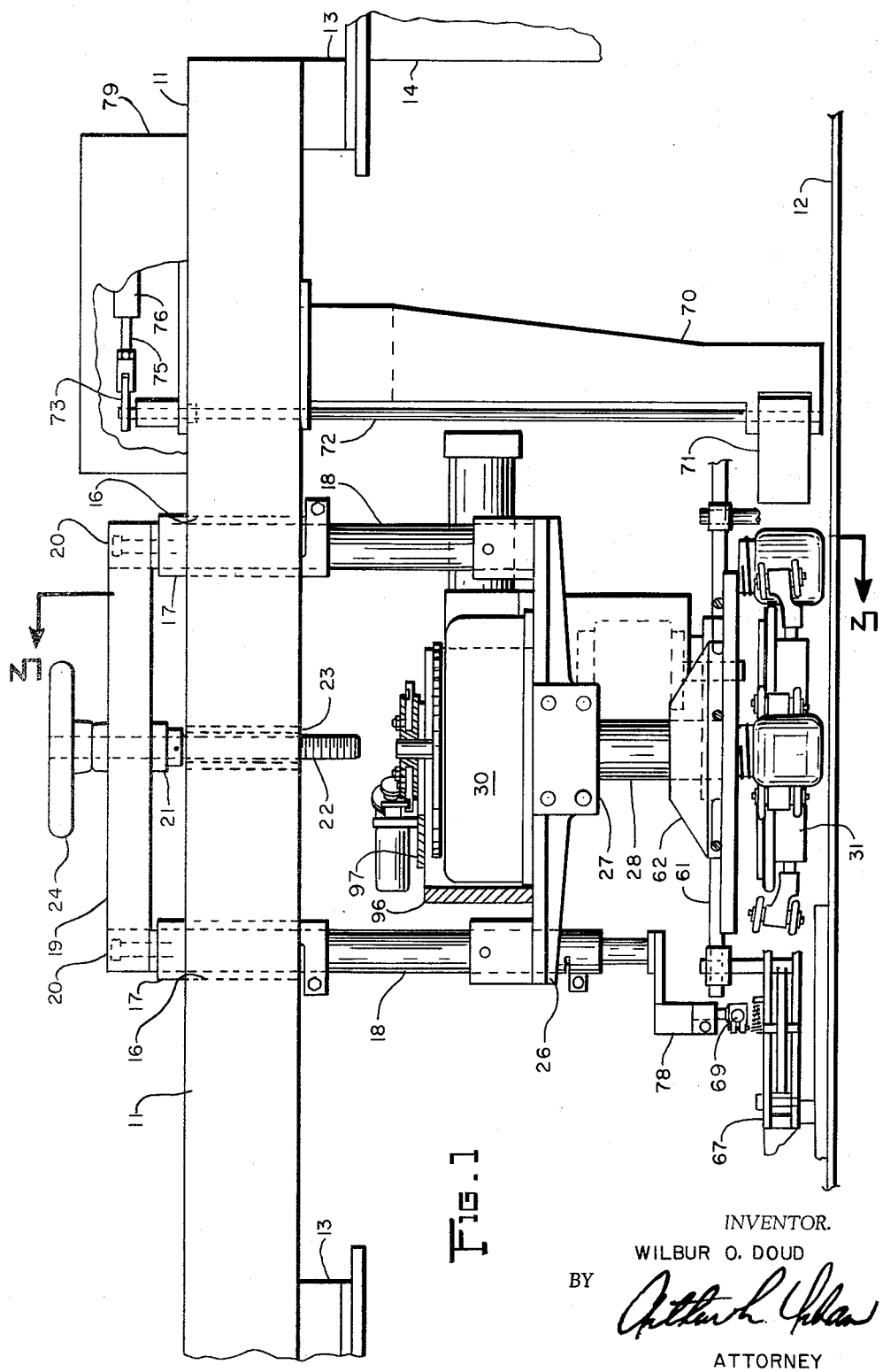

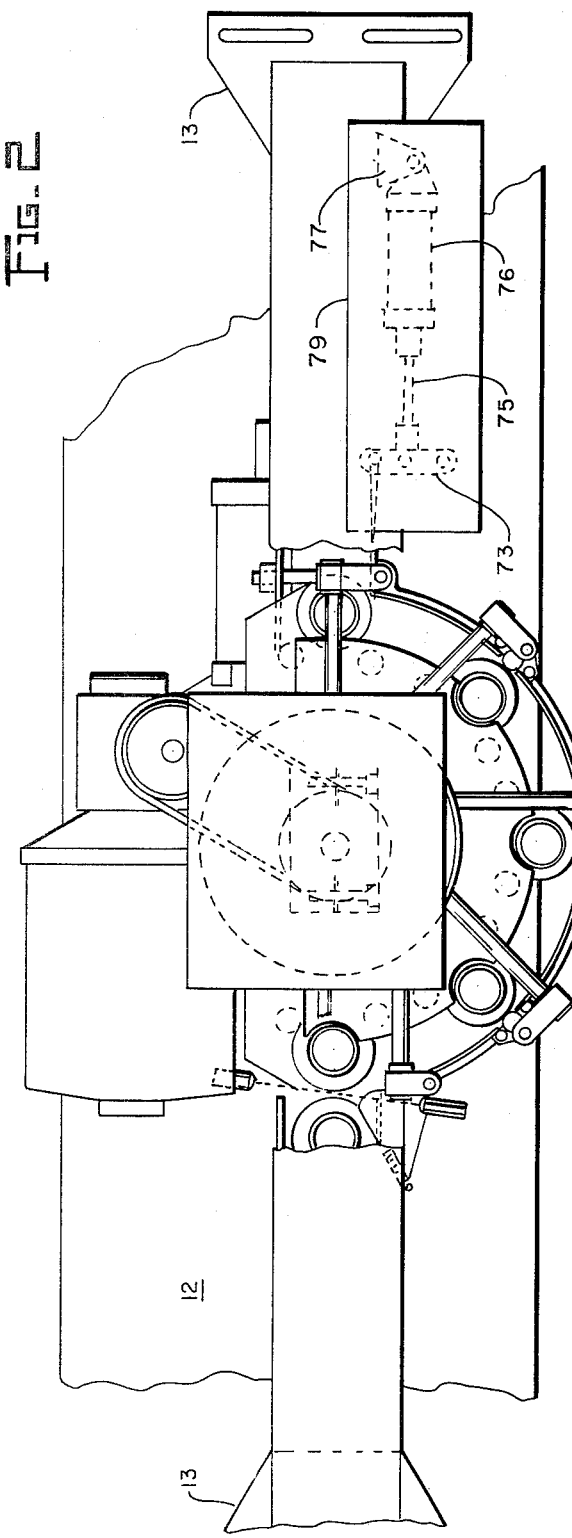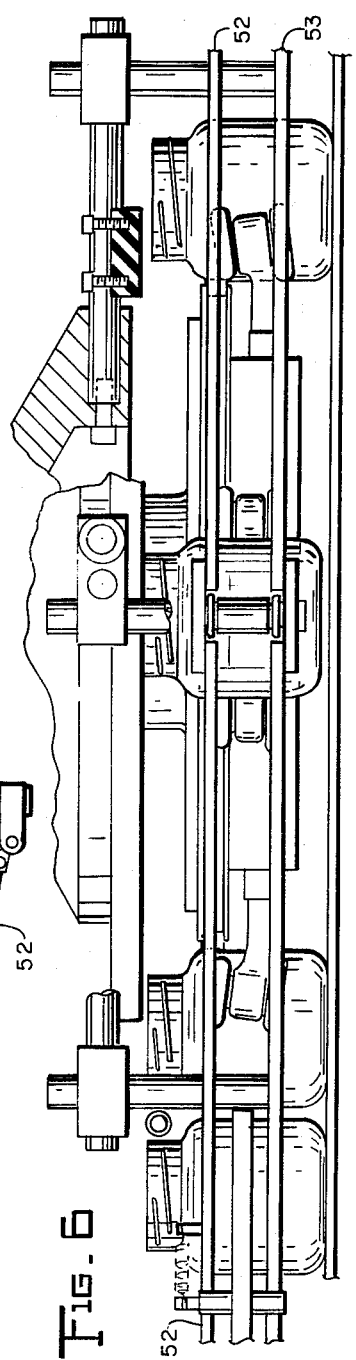
INVENTOR.
WILBUR O. DOUD

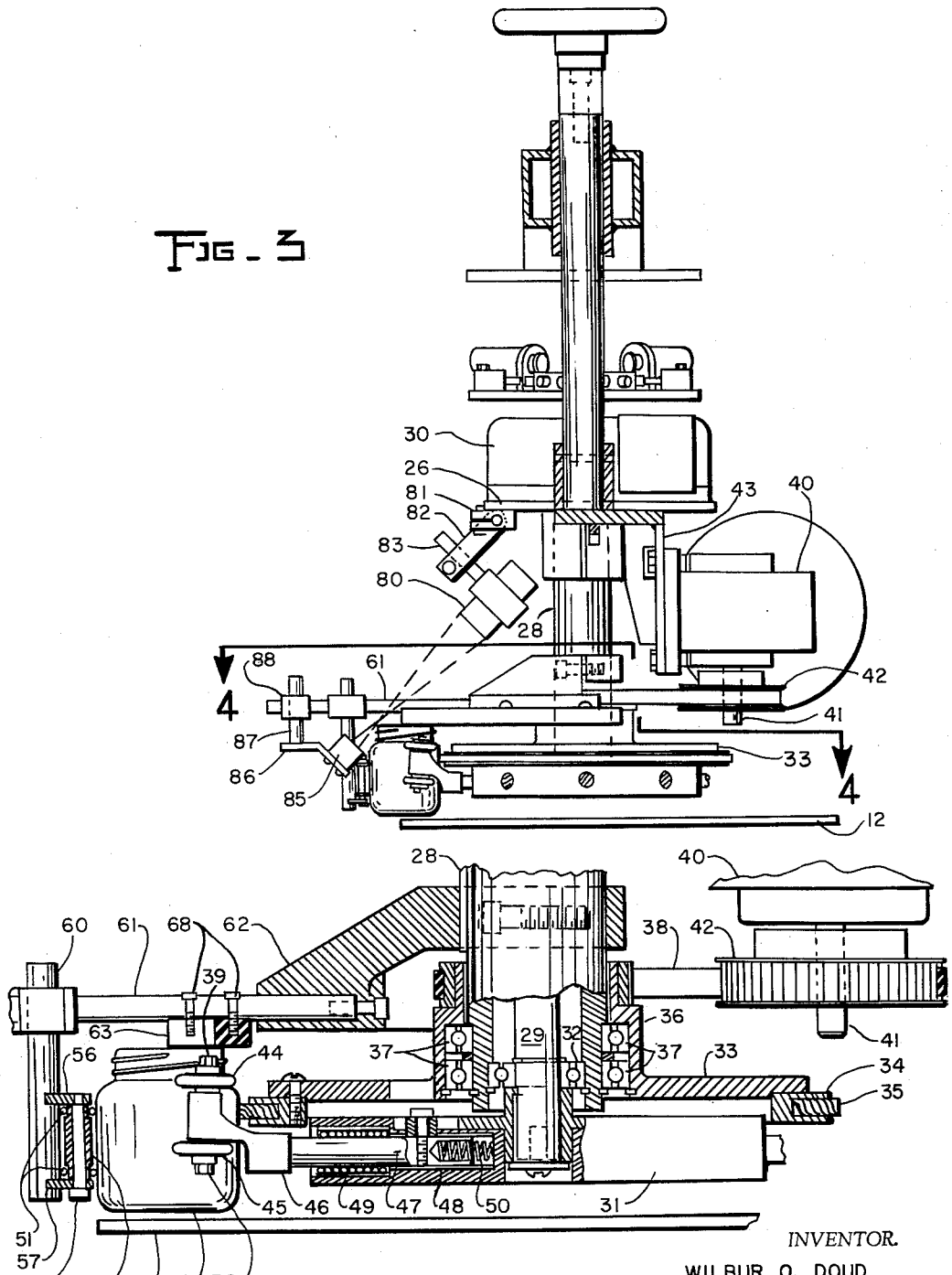

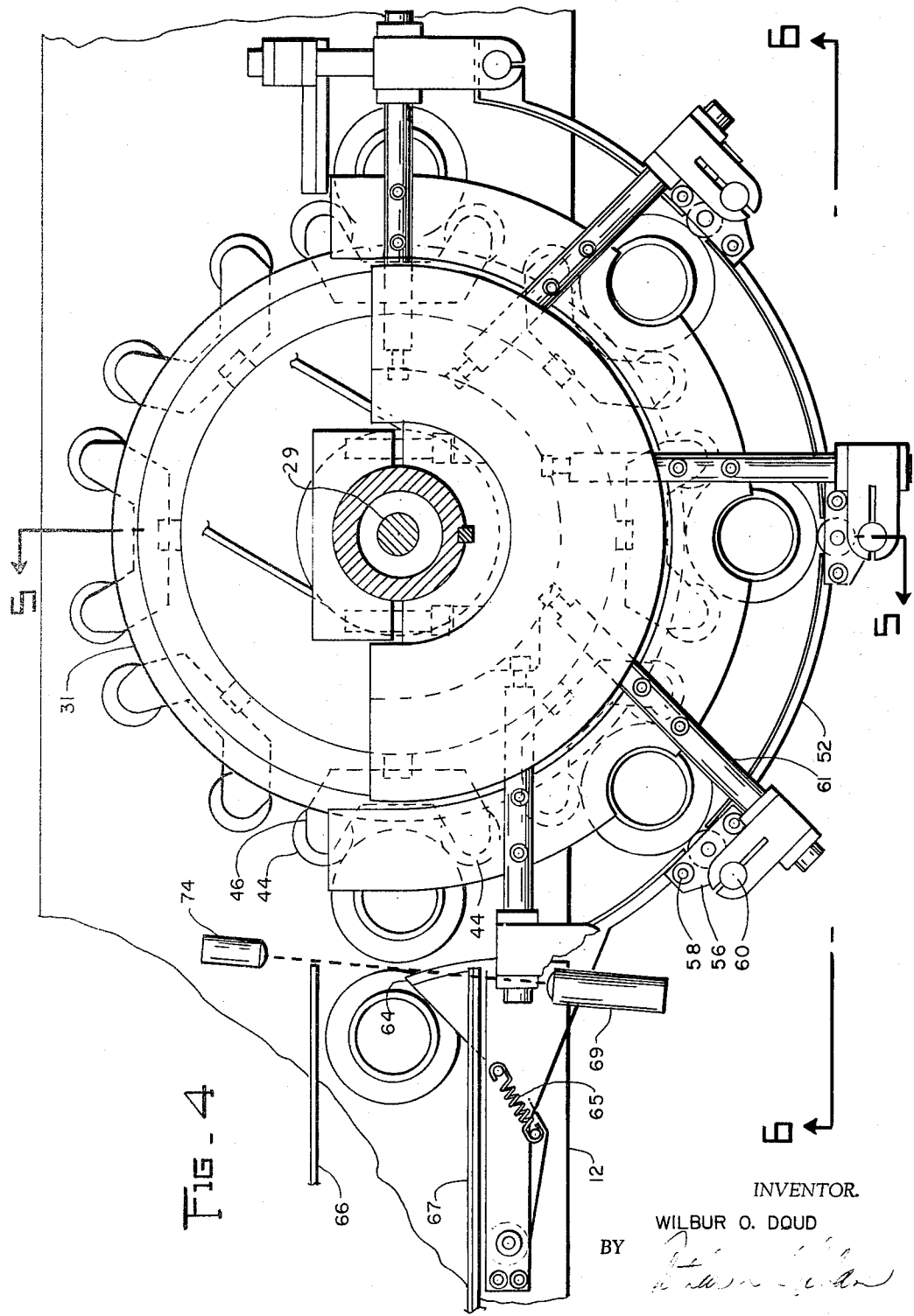

INVENTOR.
WILBUR O. DOUD
BY
ATTORNEY

April 12, 1966 W. O. DOUD 3,245,529
FLAW DETECTION METHOD AND APPARATUS
Filed April 24, 1964 7 Sheets-Sheet 7

INVENTOR.
WILBUR O. DOUD
BY
ATTORNEY

United States Patent Office 3,245,529
Patented Apr. 12, 1966

3,245,529
FLAW DETECTION METHOD AND APPARATUS
Wilbur O. Doud, Muncie, Ind., assignor to Ball Brothers Company Incorporated, Muncie, Ind., a corporation of Indiana
Filed Apr. 24, 1964, Ser. No. 362,445
19 Claims. (Cl. 209—75)

This invention relates to a new and improved flaw detection method and apparatus and more particularly relates to a new and improved method and apparatus for detecting flaws in glassware.

In the past, glassware has been inspected and packed by positioning a number of individuals around the end of an annealing lehr conveyor. However, increases in the operating speeds of forming machines and annealing equipment have made it expedient to develop inspection procedures which could handle the higher rates of production. Placement of additional inspectors and packers around the discharge end of the lehr conveyor has not proven successful due to the limited space around the end of the conveyor which could not accommodate the increased number of inspectors required. In addition, the higher rates of production tended to increase the number of defective pieces of ware which are inadvertently passed by the inspectors thereby lowering quality standards.

Various methods and apparatus for inspecting glassware have been proposed but none of the proposals have proven to be completely successful. Some could not accommodate high production rates while others did not provide the high degree of accuracy required in the detection of the flaws.

In view of the above and other shortcomings of previously employed glassware inspection methods and apparatus, it was completely unexpected and surprising to discover the new and improved flaw detection method and apparatus of the present invention. The method and apparatus of the invention permit high speed inspection of glassware with a high level of accuracy. Moreover, the design of the apparatus of the invention provides trouble-free operation even at high rates of speed over extended periods of time. Furthermore, the method and apparatus permit a high degree of flexibility in the inspection operation. In addition, the apparatus has the additional advantage that a plurality of inspection operations may be performed in sequence while the ware is passing through the apparatus. Also, the apparatus is relatively simple in design and low in manufacturing cost.

Other benefits and advantages of the method and apparatus of the present invention will be apparent from the following description and drawings in which:

FIGURE 1 is a side elevation partially in section of the apparatus of the invention;

FIGURE 2 is a plan view of the apparatus shown in FIGURE 1;

FIGURE 3 is a view taken along line 3—3 of FIGURE 1;

FIGURE 4 is an enlarged view taken along line 4—4 of FIGURE 3;

FIGURE 5 is a view taken along line 5—5 of FIGURE 4;

FIGURE 6 is a view taken along line 6—6 of FIGURE 4;

Figure 7:
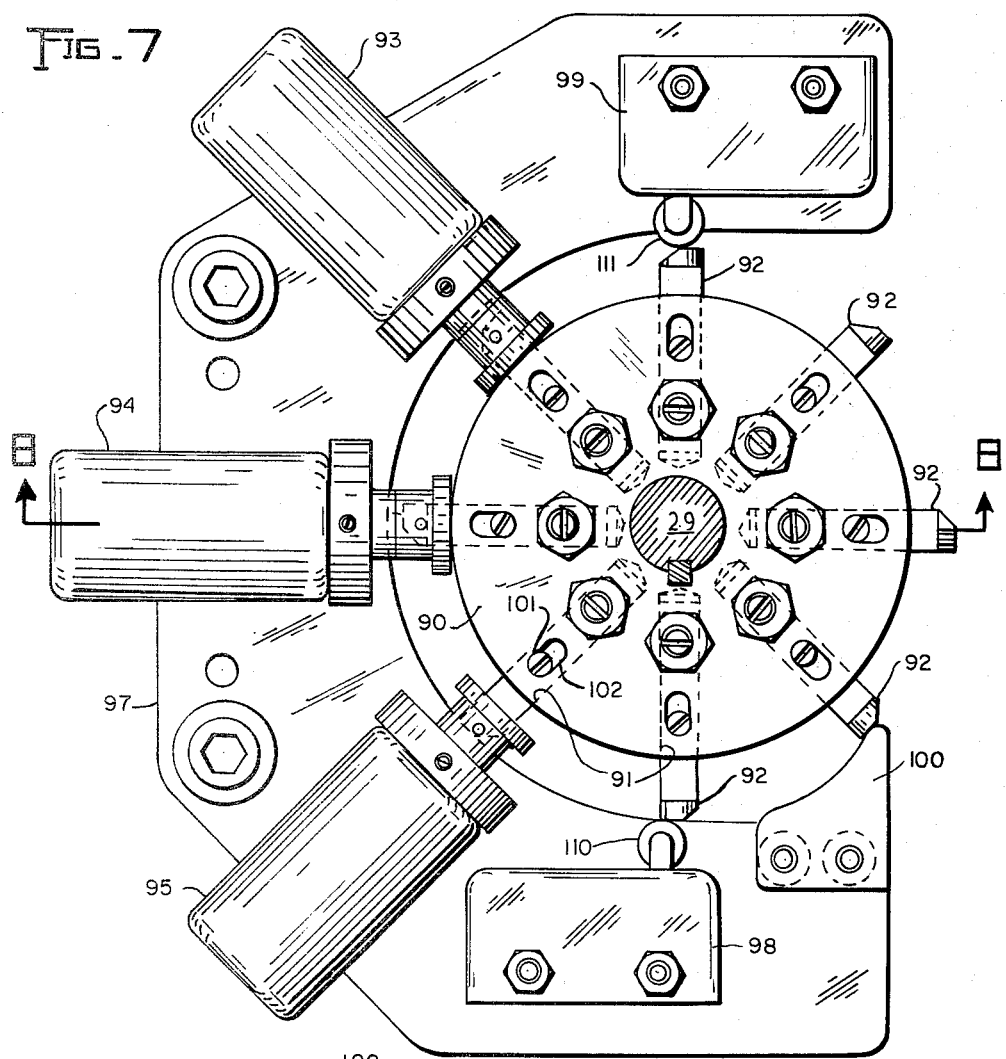
FIGURE 7 is an enlarged plan view of a memory assembly of the apparatus shown in FIGURE 1.

As shown in the drawings, one form of flaw detection apparatus of the invention comprises a horizontal member 11 disposed above a conveyor belt 12 and supported by cross members 13 carried by vertical supports 14, one of which is partially shown in the drawings. Horizontal member 11 has a plurality of vertical openings 16 in which are disposed sleeves 17. Within sleeves 17 are slidably positioned posts 18. The upper portions of posts 18 are secured to a cross member 19 by suitable fasteners 20.

The distance between the lower portions of posts 18 and the conveyor belt 12 is adjustable by means of a threaded screw 22 which is rotatably mounted in an opening within member 19 and engages a threaded bushing 23 in horizontal member 11. Rotation of screw 22 is achieved through the movement of handwheel 24 secured to the upper end of screw 22. A collar 21 is secured to screw 22 at a point below member 19.

The lower portions of posts 18 are connected to a support 26 which has an opening 27 therein from which a shaft housing 28 depends. Within shaft housing 28 is disposed a rotatable shaft 29 which is driven by a suitable drive means such as air motor 30. A guide head 31 is secured to the lower portion of shaft 29.

As shown in FIGURES 3 and 5, on the outer surface of housing 28 near the lower end thereof is rotatably mounted a disc 33 with bearings 37 disposed therebetween. Secured to disc 33 is an annular rim 34 having an outer ring 35 of rubber or a similar resilient material. Disc 33 has an upwardly extending collar portion 36 which is engaged by a drive belt 38. Belt 38 is driven by a suitable drive means such as motor 40 shown in the drawings. Motor 40 has a shaft 41 on which is secured a pulley 42 which is connected to collar 36 by means of belt 38. Motor 40 is mounted on support 26 by a suitable bracket 43.

Guide head 31 has a plurality of rollers 44 and 45 which are biased outwardly from the periphery of the head. A suitable mounting as shown in the drawings includes a plurality of frames 46 having shafts 39 and 39a on which rollers 44 and 45, respectively, are rotatably mounted. Frames 46 are secured to rods 47 carried by bearings 49, which rods are longitudinally movable in openings 48 of the guide head. Coil springs 50 bias the assemblies outward from the center of the guide head 31. Bearing 32 is disposed between housing 28 and shaft 29.

Guide rails 52 and 53 are positioned circumferentially about the guide head 31 and spaced therefrom. The guide rails 52 and 53 are interrupted at spaced intervals by vertically rotatable rollers 54 having rubber rings 51 disposed thereon, the rollers being carried by shafts 59. Guide rails 52 and 53 and rollers 54 are maintained in proper position above the conveyor belt 12 by the use of brackets 56 and 57 which are disposed above and below rollers 54 and connected to rails 52 and 53 by fasteners 58. Brackets 56 and 57 in turn are secured to vertical rods 60 which are adjustably connected to horizontal supports 61 extending outwardly from a frame member 62 secured to housing 28. A reference surface shown in the drawings as an arcuate plate 63 is secured below supports 61 by suitable fasteners 68.

A movable pawl 64 is disposed at the glassware receiving portion of the guide rails 52 and 53. The pawl has a spring 65 to bias it in an extended position partially blocking the path of glassware moving between main guide rails 66 and 67. A photocell 69 and receiver 74 are positioned above pawl 64 and supported by bracket 78 connected to one of the posts 18.

At the ware discharge portion of the guide rails 52 and 53 is disposed a reject gate assembly including a leg 70 depending from horizontal member 11 toward conveyor belt 12. The lower portion of leg 70 has a pivotally mounted deflector 71 which is secured to a rotatable rod 72 which extends upwardly to a link 73. One end of link 73 is secured to rod 72 and the opposite end is pivotally connected to a piston rod 75 which extends from a fluid cylinder 76. The opposite end of cylinder 76 is pivotally connected to enclosure 79 through a suitable bracket 77.

Photocells 80 are positioned to cast their beams onto ware moving through the apparatus. As shown in the drawings, photocells 80 may be adjustably connected to support 26 by means of suitable brackets and supports 81, 82, and 83. Opposite to the beams of the photocells are disposed receivers 85 suitably mounted as shown in the drawings to supports 61 through brackets and supports 86, 87, and 88.

Figure 8:
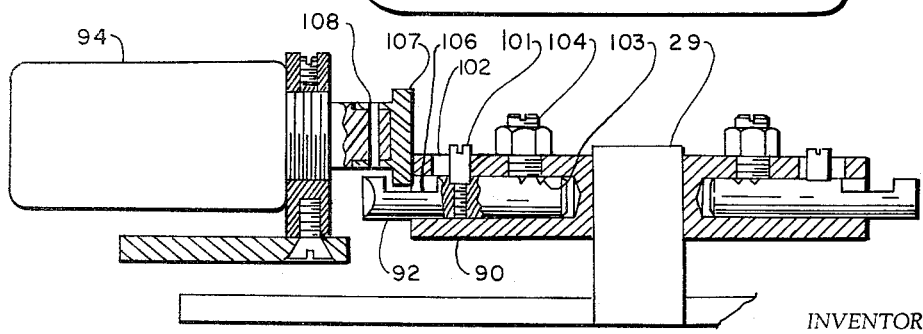
FIGURE 8 is a view taken along line 8—8 of FIGURE 7.

One arrangement for recording and storing the signals from receivers 85 for proper actuation of the reject gate assembly is the memory unit shown in FIGURES 7 and 8. To the upper part of shaft 29 is affixed a disc 90 having a plurality of openings 91 therein into which are disposed slidable pins 92. Around the periphery of disc 90 are positioned pull type solenoids 93, 94, and 95, one solenoid for each inspection position. The solenoids are secured to an arcuate plate 97 which is mounted above air motor 30 on a member 96 extending upwardly from support 26. Switches 98 and 99 are also mounted on plate 97 as is a cam plate 100.

Each of the pins 92 has a stop 101 extending upwardly therefrom into engagement with an elongated opening 102 in disc 90. Pin 92 has a number of grooves 103 in the inwardly extending portion thereof which grooves receive a ball plunger 104 extending downwardly through disc 90 into opening 91 thereby permitting pin 92 to be retained in several positions. The outwardly extending portion of the pin 92 has an upwardly extending transverse slot 106 which engages a flanged cap 107 secured to solenoid 92, 93, or 94 with a pin 108. Switches 98 and 99 have depressible rollers 110 and 111, respectively, which actuate the switches.

Figure 9:
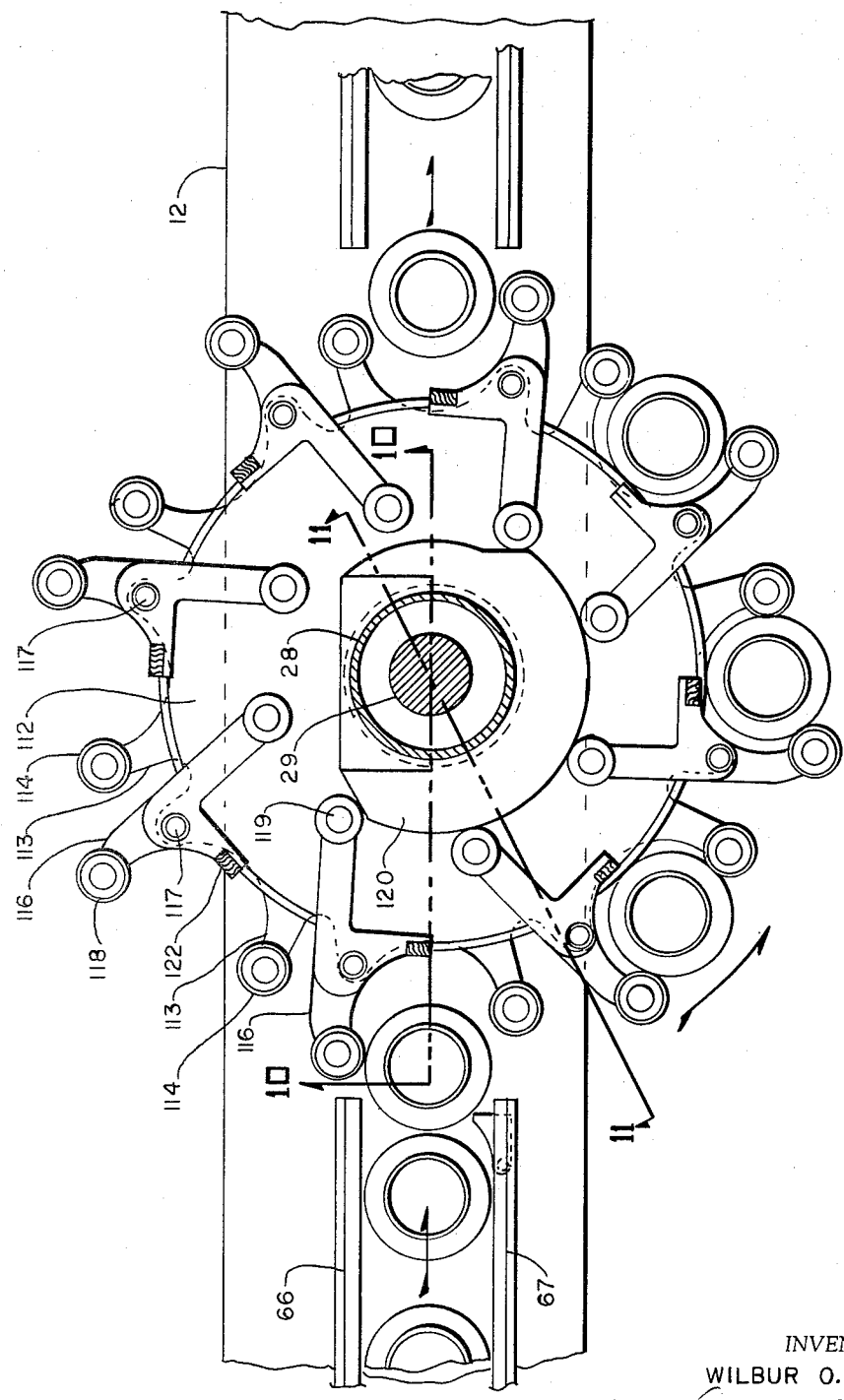
FIGURE 9 is a plan view of another form of apparatus of the invention.
Figure 10:
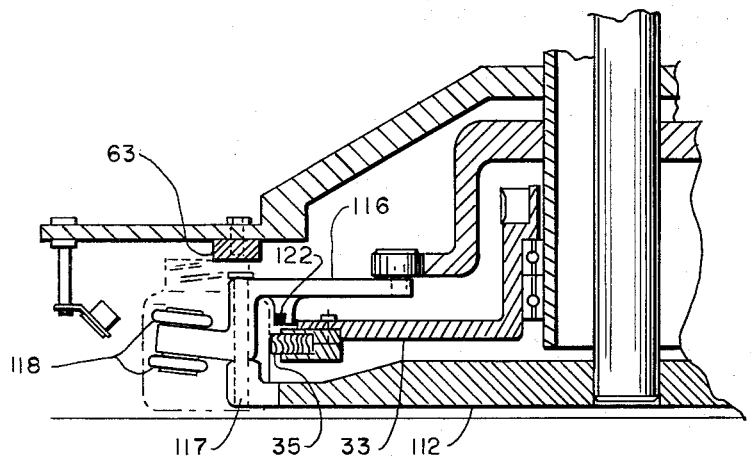
FIGURE 10 is a view taken along line 10—10 of FIGURE 9.
Figure 11:
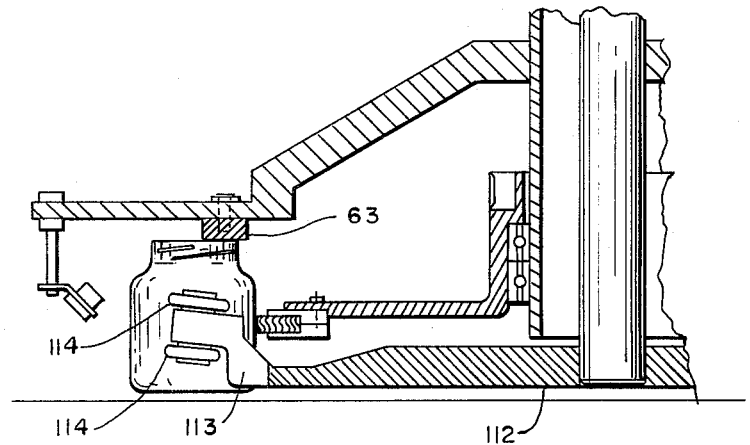
FIGURE 11 is a view taken along line 11—11 of FIGURE 9.

Another form of guide head shown in FIGURES 9–11 which may be affixed to housing 28 surrounding shaft 29 comprises a guide head 112 having a plurality of arms 113 extending outwardly from the periphery thereof. Near the end of each arm 113 are disposed rollers 114 mounted on a vertical shaft (not shown) carried by arm 113. A second series of arms 116 are pivotably mounted on guide head 112 by pins 117. Each arm 116 has rollers 118 disposed on the end thereof in a manner similar to rollers 114 on arms 113. The inwardly extending portion of each arm 116 has a cam follower roller 119 which engages a cam 120 secured to housing 28. Arm 116 also has a nonmetallic insert 122 affixed to a portion thereof at a point disposed from rollers 118.

In the method of the invention, as performed on the apparatus shown in FIGURES 1–8, jars 10 are advanced by the movement of conveyor belt 12 between main guide rails 66 and 67 until each jar bears against spring mounted pawl 64. Pressure of the jar against the pawl moves the pawl aside so that the jar contacts pairs of rollers 44 and 45 extending outwardly from guide head 31. As the jar moves into contact with the rollers 44 and 45, the pawl 64 swings back into its extended position through the action of spring 65 connected thereto. Also, the advancing jar breaks the beam from cell 69 to receiver 74 which, through appropriate circuitry, causes air motor 30 to rotate guide head 31, for example, approximately 45°, placing the jar in contact with roller 54 and in the first inspection position. The use of such an arrangement prevents possible damage to the apparatus since a broken jar or a jar in a down position would pass under the beam rather than break it, and thus the motor 30 would not rotate the jar to the first inspection position.

As the jar is being moved by guide head 31 and rollers 44 and 45 to the first inspection position, one side of the jar bears against the guide rails 52 and 53 and the opposite side against the periphery of ring 35 of rotating disc 33. The rotation of disc 33 and ring 35 causes the jar to be rotated on its central axis. Since the axes of rollers 44 and 45 which also bear against the jar, diverge in an upwardly direction, the jar will move upward and be raised from the belt during its rotation. This upward movement of the jar continues until the upper surface or finish of the jar bears against the lower reference surface of arcuate plate 63. The angle between the axes of rollers 44 and 45 is sufficiently great that the lip of the jar will move into a raised position against the plate 63 before the jar reaches the first inspection position opposite roller 54. As shown in FIGURE 5, only a part, or segment of the lip of the jar contacts plate 63, so that as the jar is rotated, each segment is alternately exposed and in contact with the reference plate.

At the first inspection position, the jar is checked for defects by detecting means such as the beam of one or more photocells 80 directed upon the portion of the jar to be inspected with one or more receivers 85 noting any variations in the intensity of the beam due to flaws in the jar as it is rotated. Any variations in the beam from photocells 80 received by receivers 85 while the jar is being rotated at the first inspection position actuates solenoid 93 pulling pin 92 adjacent thereto into an extended position.

Movement of a second jar from between rails 66 and 67 into contact with rollers 44 and 45 breaks the beam from cell 69 to receiver 74 which causes air motor 30 to rotate guide head 31 and advance the second jar to the first inspection position and the first jar to the second inspection position. During the transfer of the first jar to the second inspection position, the rotation of disc 33 and ring 35 continues the rotation of the jar and maintains it in an elevated position bearing against plate 63.

At the second inspection position, a different portion of the jar is inspected from that inspected previously at the first position. For example, if the finish or sealing surface was checked for defects in the first inspection position, the shoulder, sidewall or heel might be checked in the second and succeeding positions. Also, the bottom advantageously may be checked in the second inspection position since a portion or all of the bottom may be exposed beyond the edge of the belt 12. A second combination of one or more photocells 80 and receivers 85 or similar electrical or electronic detecting means such as a probe, etc. determines whether any flaws are present in the jar as it is being rotated, and these variations in intensity of the beams through appropriate circuitry actuate solenoid 94 and which pulls out a pin 92 adjacent thereto into an extended position.

Thereafter, the jar is moved by the further rotation of guide head 31 as described above an additional 45° or so to a third inspection position. At the third position, the ware is inspected for additional defects by the employment of combinations of photocells 80 and receivers 85 or other means including mechanical means in a manner similar to the inspection performed at the first and second inspection positions.

After the inspection of the ware at the third position, the ware is advanced approximately an additional 45° to a discharge position. The guide rails 52 and 53 terminate short of the discharge position with the result that the pressure of the jar against the rotating disc 33 and the rollers 44 and 45 is substantially reduced which permits the jar to drop from contact with plate 63 onto moving conveyor belt 12.

The inspected jar is advanced by the belt toward deflector 71 of the reject assembly. If photocells 80 and receivers 85 or other detectors have discovered a flaw in the jar as a result of a variation in the intensity of the beams received by receivers 85, this variation in intensity will actuate a solenoid and cause the pin 92 above the particular jar to be extended. As each extended pin 92 passes switch 98, the switch roller 110 is depressed which, through appropriate circuitry, introduces a fluid such as air into cylinder 76, causing rod 75 to extend, moving link 73 and causing rod 72 and deflector 71 to move to a different position. This change in the position of plate 71 causes the defective jar to be deflected from the acceptable ware and off of the conveyor belt 12 to a receptacle for defective jars (not shown). As shaft 29 is further rotated during the inspection of succeeding jars, the extended pin 92 will bear against cam plate 100 which returns the pin to its retracted position. Additional rotation of shaft 29 causes the pin to depress the roller 111 of switch 99 which actuates cylinder 76 returning deflector 71 to its original position.

In the operation of the apparatus shown in FIGURES 9–11, jars are advanced between guide rails 66 and 67 into contact with guide head 112. As guide head 112 is rotated, the position of cam follower roller 119 changes as it moves with respect to stationary cam 120. The change in position of follower 119 causes arm 116 to pivot about pin 117 moving rollers 118 into contact with the jar and forcing the jar against rollers 114 on the opposite side thereof. Since the shafts which carry rollers 114 and 118 diverge upwardly, the rotation of disc 33 and peripheral ring 35 thereon causes the jar to rotate on its axis and move upwardly into contact with the lower reference surface of plate 63. The jar being held between rollers 114 and 118 and rotating ring 35 is transferred to each inspection position.

After the last inspection has been completed, the cam follower roller 119 moves onto a depressed portion of the cam 120 which allows arm 116 to pivot and return to its original position. This movement causes roller 118 to move away from the jar and releases the jar so that it drops onto belt 12 again. The jar then advances along the belt and, if it is defective, is separated in a manner similar to the above described procedure.

While the above description of the invention and drawings describe a flaw detection apparatus for glassware in which three inspection positions are present, it will be apparent that the number of positions may be decreased or increased as desired. For example, a single inspection position may be employed with each rotating guide head. On the other hand, the number of positions might be increased to five or more such as by increasing the circumferential movement of the glassware around the apparatus from 180° to 270° or more. Moreover, the flaw detection means may be of a different type, for example, probes, feelers, mirrors, etc. employed both with electrical or electronic devices or with mechanical detectors. Also, the roller arrangement employed to raise the jars from the conveyor belt to the reference surface may be changed in design and the number of rollers may be increased or decreased as desired for particular shapes and configurations of ware. Furthermore, while the rotating disc employed to rotate the jars as they move through the apparatus preferably operates continuously, the rotation of the disc may be intermittent or other drive means may be employed to rotate the jars. Advantageously, the jar guide heads 31 and 112 are operated intermittently as the jars are moved from one inspection position to another, but it may be desirable in certain instances to employ a continuously rotating guide head. Likewise, other arrangements may be employed to separate the acceptable ware from the defective ware instead of the reject gate shown in the drawing.

The above description and drawings show that the present invention provides a new and improved method and apparatus for the detection of flaws in glassware. Furthermore, the method and apparatus of the invention permit high speed inspection, and the apparatus is simple in design and operation and trouble-free in service even at high rates of speed over extended periods of time. Moreover, the method and apparatus of the invention provide a high degree of flexibility in the inspection operations, and the apparatus permits the combining of a number of inspection steps in sequence during a single pass through the apparatus.

It will be apparent from the above description and drawings that various modifications in the specific method and apparatus described and shown in detail in the drawings may be made within the scope of the invention. For example, the number and type of inspection operations may be changed, and the various drive and guide mechanisms may be different in design. Therefore, the invention is not intended to be limited to the specific method and apparatus described and shown in detail except as required by the following claims.

What is claimed is:

1. A method of detecting flaws in glassware which comprises rotating and lifting glassware against a stationary reference surface while it is being advanced to an inspection station; inspecting said ware to detect any flaws therein; and separating defective ware from acceptable ware.

2. Apparatus for detecting flaws in glassware which comprises transfer means to advance glassware; drive means including a rotating disc the periphery of which engages said glassware to rotate said ware as it is being transferred; a reference surface substantially normal to the axis of rotation of said ware; means to urge said ware against said reference surface as it is being transferred; inspection means to detect flaws in said ware; separating means to remove defective ware from acceptable ware; and means to actuate said separating means.

3. Apparatus for detecting flaws in glassware which comprises transfer means to advance glassware; drive means to rotate said ware as it is being transferred; a reference surface substantially normal to the axis of rotation of said ware; means including canted rollers to urge said ware against said reference surface as said drive means rotates said ware; inspection means to detect flaws in said ware; separating means to remove defective ware from acceptable ware; and means to actuate said separating means.

4. Apparatus for detecting flaws in glassware which comprises conveying means; transfer means to remove glassware from said conveying means, advance it to an inspection station and return it to said conveying means; drive means to rotate said ware as it is being transferred; a reference surface substantially normal to the axis of rotation of said ware; means to urge said ware against said reference surface as it is being transferred; inspection means to detect flaws in said ware at said inspection station; separating means to remove defective ware from acceptable ware and means to actuate said separating means.

5. Apparatus for detecting flaws in glassware which comprises conveying means; transfer means to remove glassware from said conveying means, advance it to an inspection station and return it to said conveying means; drive means to rotate said ware as it is being transferred; a reference surface; means including canted rollers to lift said ware against said reference surface; inspection means including a photoelectric cell to detect flaws in said ware at said inspection station; separating means to remove defective ware from acceptable ware and circuit means to actuate said separating means.

6. Article transferring apparatus comprising rotatable shaft, a disc secured to said shaft and engageable with the article to be transferred to rotate the same when said disc is rotated, an independently rotatable guide head disposed about said shaft, arms extending radially outwardly from said guide head, rollers disposed near the end portions of said arms and engageable with said ware to position the same, drive means to rotate said disc and second drive means to rotate said guide head.

7. Article transferring apparatus comprising a rotatable shaft, a disc secured to said shaft, an independently rotatable guide head disposed about said shaft, stationary arms extending radially outwardly from said guide head, pivotally mounted arms extending radially outwardly from said guide head and disposed adjacent to said fixed arms, rollers having upwardly diverging axes disposed near the end portions of pairs of stationary and pivotally mounted arms, an inwardly extended cam follower on each pivotally mounted arm and a fixed cam surface disposed about the axis of said shaft and said guide head.

8. A method of detecting flaws in ware which comprises: rotating and urging ware against a stationary reference surface, which surface lies in a plane that is substantially normal to the predetermined axis of rotation of said ware and is spaced from said ware in a direction paralleling said axis of rotation, while said ware is being advanced to an inspection station; inspecting said ware to detect flaws therein; and separating defective ware from acceptable ware.

9. A method of detecting flaws in ware which comprises: effecting relative movement between ware to be inspected and inspection equipment; effecting rotation of said ware and relative movement between said ware and a reference surface, which surface lies in a plane that is substantially normal to the axis of rotation of said ware and is spaced from said ware in a direction paralleling said axis of rotation, to thereby bring said ware and said reference surface toward contact with one another while said relative movement is effected between said ware and inspection equipment; inspecting said ware while said ware and said reference surfaces are in contact with one another to detect flaws in said ware; and separating defective ware from acceptable ware.

10. A method of detecting flaws in glassware which comprises: effecting relative movement between glassware to be inspected and inspection equipment; effecting rotation of said ware about its central axis and relative movement between said ware and a reference surface, which surface lies in a plane that is substantially normal to said central axis of said ware and is spaced from one end of said ware in a direction paralleling said central axis, to thereby bring said one end of said ware and said reference surface toward contact with one another while said relative movement is effected between said ware and inspection equipment; inspecting said ware while said end of said ware and said reference surface are in contact with one another to detect flaws in said ware; and separating defective ware from acceptable ware.

11. A method of detecting flaws in glassware which comprises: effecting rotation of glassware about its central axis and relative movement between said ware and a reference surface that is substantially normal to said central axis of said ware to thereby bring the lip of said ware and said reference surface into contact with one another so that each segment of said lip is alternately exposed and in contact with said reference surface as said ware is rotated; inspecting each segment of the lip of said ware when exposed to detect flaws therein; and separating defective ware from acceptable ware.

12. A method of detecting flaws in glassware which comprises: rotating glassware about a substantially vertical axis and lifting said ware against a stationary reference surface, which surface lies in a plane that is substantially horizontal, to thereby bring said rotating ware into contact with said reference surface while said ware is being advanced to an inspection station; inspecting said ware to detect flaws therein; and separating defective ware from acceptable ware.

13. A method of detecting flaws in glassware which comprises: effecting relative movement between glassware be inspected and inspection apparatus; effecting rotation of glassware about its central axis and relative movement between said ware and a reference surface, which surface lies in a plane that is substantially normal to the axis of rotation of said ware and is spaced from said ware in a direction paralleling said axis of rotation, to thereby bring said ware and said reference surface toward contact with one another while said relative movement is effected between said ware and inspection equipment; directing light at a portion of said ware while said ware and said reference surface are in contact with one another to inspect said ware; receiving at least a portion of said light after it has been directed to said portion of said ware; measuring variations in the intensity of said received light; and separating defective ware from acceptable ware when predetermined variations in said received light occur.

14. Apparatus for detecting flaws in ware which comprises: inspection means for detecting flaws in ware; transfer means for effecting relative movement between said ware and said inspection means; drive means to rotate said ware during said relative movement between said ware and said inspection means and inspection of said ware; a reference surface which lies in a plane that is substantially normal to the axis of rotation of said ware and is spaced from said ware in a direction paralleling said axis of rotation; positioning means for causing relative movement between said ware and said reference surface to thereby bring said ware and said reference surface toward contact with one another while said relative movement is effected between said ware and said inspection means; separating means to separate defective ware from acceptable ware; and means connected with said inspection means to actuate said separating means.

15. Apparatus for detecting flaws in ware which comprises: inspection means for detecting flaws in said ware; transfer means for effecting relative movement between said ware and said inspection means; drive means to rotate said ware about its central axis during said relative movement between said ware and said inspection means and inspection of said ware; a reference surface which lies in a plane that is substantially normal to the axis of rotation of said ware and is spaced from said ware in a direction paralleling said central axis; positioning means for causing relative movement between said ware and said reference surface to thereby bring said ware and said reference surface toward contact with one another while said relative movement is effected between said ware and said inspection means; separating means to separate defective ware from acceptable ware; and means connected with said inspection means to actuate said separating means.

16. Apparatus for detecting flaws in glassware which comprises: drive means to rotate glassware about its central axis; a nonrotatable reference surface at the same side of said glassware as is the lip thereof; positioning means for causing relative movement between said ware and said reference surface to thereby bring the lip of said ware and said reference surface into contact with one another so that each segment of said lip is alternately exposed and in contact with said reference surface as said ware is rotated; inspection means for inspecting each segment of the lip of said ware when in exposed position to detect flaws therein; and means for separating defective ware from acceptable ware.

17. Apparatus for detecting flaws in glassware which comprises: a stationary reference surface which lies in a substantially horizontal plane; inspection means for detecting flaws in said ware; transfer means for effecting movement of said ware toward said inspection means; positioning means for lifting said ware toward said reference surface while said movement of said ware is effected toward said inspection apparatus; means for rotating glassware to be inspected at least while said ware is being transferred toward said inspection means and inspection of said ware; separating means to separate defective ware from acceptable ware; and means connected with said inspection means to actuate said separating means.

18. Apparatus for detecting flaws in ware which comprises: drive means to rotate said ware; a reference surface, which surface lies in a plane that is substantially normal to the axis of rotation of said ware and is spaced from said ware in a direction paralleling said axis of rotation; first and second ware-engaging means for contacting said ware at separate positions and in conjunction with said drive means positioning said ware for inspecton purposes with said ware in contact with said reference surface; cam means for controlling said ware engaging means; inspection means for detecting flaws in said ware while said ware is rotating and maintained in contact with said reference surface; and means for separating acceptable ware from unacceptable ware.

19. Apparatus for detecting flaws in ware which comprises: transfer means for advancing ware to be inspected; a reference surface that lies in a plane substantially normal to the predetermined axis of rotation of said ware; drive means for rotating and urging said ware against said reference surface while said ware is being advanced to be inspected by said transfer means, said ware being initially spaced from said plane in a direction paralleling the axis of rotation of said ware; inspection means for inspecting ware; and separating means for separating acceptable ware from unacceptable ware.

References Cited by the Examiner

UNITED STATES PATENTS

| | | | |
|---|---|---|---|
| 1,626,359 | 4/1927 | Rundell. | |
| 2,132,447 | 10/1938 | Stout. | |
| 2,578,573 | 12/1951 | Mills | 209—88 |
| 2,606,657 | 8/1952 | Berthelsen | 209—75 |
| 2,818,473 | 12/1957 | Geder | 200—38 |
| 2,902,151 | 9/1959 | Miles | 209—111.7 |
| 2,934,614 | 4/1960 | Buss | 200—38 |
| 3,074,550 | 1/1963 | Moreland | 209—75 |
| 3,101,848 | 8/1963 | Uhlig | 209—72 |
| 3,171,033 | 2/1965 | Mathias | 250—224 |

M. HENSON WOOD, Jr., *Primary Examiner.*

J. ERLICH, *Assistant Examiner.*